US011953647B2

(12) United States Patent
AlQatari

(10) Patent No.: US 11,953,647 B2
(45) Date of Patent: Apr. 9, 2024

(54) SYSTEM AND METHOD FOR RADIOACTIVITY PREDICTION TO EVALUATE FORMATION PRODUCTIVITY

(71) Applicant: Saudi Arabian Oil Company, Dhahran (SA)

(72) Inventor: Ammar AlQatari, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 161 days.

(21) Appl. No.: 17/453,719

(22) Filed: Nov. 5, 2021

(65) Prior Publication Data
US 2023/0142227 A1 May 11, 2023

(51) Int. Cl.
G01V 5/06 (2006.01)
E21B 49/00 (2006.01)
G06N 20/00 (2019.01)

(52) U.S. Cl.
CPC ............ G01V 5/06 (2013.01); E21B 49/00 (2013.01); G06N 20/00 (2019.01); E21B 2200/20 (2020.05)

(58) Field of Classification Search
CPC ....... G01V 5/06; E21B 49/00; E21B 2200/20; G06N 20/00; G06N 3/045; G06N 3/08
See application file for complete search history.

(56) References Cited

U.S. PATENT DOCUMENTS 6,295,504 B1  9/2001  Ye et al.
7,205,535 B2  4/2007  Madigan et al.
8,126,647 B2  2/2012  Hruska et al.
9,514,388 B2  12/2016  Chen et al.
10,324,229 B2  6/2019  Theologou et al.
(Continued)

FOREIGN PATENT DOCUMENTS

JP         2004279192 A1    10/2004
WO    WO-2020185716 A1 *  9/2020  ............ E21B 49/00
WO       2021043310 A1    3/2021

OTHER PUBLICATIONS

Wang et al., "Predicting formation lithology from log data by using a neural network", Pet.Sci.(2008)5:242-246 (Year: 2008).*
(Continued)

Primary Examiner — Farhana A Hoque
Assistant Examiner — Dilara Sultana
(74) Attorney, Agent, or Firm — Leason Ellis LLP

(57) ABSTRACT

Systems and methods for evaluating a subsurface region of the earth for hydrocarbon exploration, development, or production are disclosed. Embodiments of the present disclosure are configured to determine advanced radioactive formation data from commonly acquired well logging data sets. In particular, a predictive model is trained to generate "synthetic" spectral gamma ray logs are from basic neutron, density and total gamma ray logs measured from a well within the formation. The predictive model comprises a neural network that is trained using multi-resolution graph clustering techniques to correlate patterns in the density, neutron and gamma ray log data to patterns in spectral gamma ray log data. Embodiments of the present disclosure are further configured to use the synthetic spectral gamma ray logs output by the model to quantify the clay content of the formation, its permeability and determine a hydrocarbon productivity index for the formation.

18 Claims, 9 Drawing Sheets

(56) References Cited

U.S. PATENT DOCUMENTS

| | | | |
|---|---|---|---|
| 10,599,987 B2 | 3/2020 | Hassan et al. | |
| 10,677,052 B2 | 6/2020 | Storm, Jr. et al. | |
| 2007/0011115 A1* | 1/2007 | Smith | G06N 3/045 |
| | | | 706/15 |
| 2007/0246649 A1* | 10/2007 | Jacobi | G01V 5/12 |
| | | | 250/269.6 |
| 2013/0325349 A1 | 12/2013 | Bunting et al. | |
| 2018/0267199 A1* | 9/2018 | Xu | G01V 5/045 |
| 2019/0169986 A1* | 6/2019 | Storm, Jr. | G01V 11/00 |
| 2020/0116879 A1 | 4/2020 | Pavlovski | |
| 2021/0098142 A1 | 4/2021 | Hosokawa et al. | |
| 2021/0140298 A1 | 5/2021 | Bakulin et al. | |

OTHER PUBLICATIONS

Zhou et al., "Abstract—Predicting Mineralogy of the Salt-Gypsum Layer by Drilling Cuttings and Conventional Well Logging Data Using a Multilayer Perceptron Neural Network (MLPNN): A Case Study in Kuqa Depression, Tarim Basin" (Abstract Only), Paper presented at the 55th U.S. Rock Mechanics/Geomechanics Symposium, Virtual, Jun. 2021.

Ye et al., "Abstract—A New Tool for Electro-Facies Analysis: Multi-Resolution Graph-Based Clustering" (Abstract Only), Paper presented at the SPWLA 41st Annual Logging Symposium, Dallas, Texas, Jun. 2000.

Passos et al., "Electrofacies Classification of Ponta Grossa Formation by Multi-Resolution Graph-Based Clustering (MRGC) and Self-Organizing Maps (SOM) Methods", Brazilian Journal of Geophysics, Mar. 2020, vol. 38, No. 1.

Corina et al., "Automatic lithology prediction from well logging using kernel destiny estimation", Norwegian University of Science and Technology, Jun. 2018.

Dixit et al., "Machine Learning-Based Probabilistic Lithofacies Prediction from Conventional Well Logs: A Case from the Umiat Oil Field of Alaska", Energies, Sep. 2020.

Freedman et al., "New Method for Determining Mineralogy and Matrix Properties From Elemental Chemistry Measured by Gamma Ray Spectroscopy Logging Tools", SPE Resevoir Evaluation & Engineering, Nov. 2015, pp. 599-608.

Xu et al., "Spectral Gamma-Ray Measurement While Drilling", Petrophysics, Aug. 2016, pp. 377-389, vol. 57, No. 4.

* cited by examiner

SYSTEM AND METHOD FOR RADIOACTIVITY PREDICTION TO EVALUATE FORMATION PRODUCTIVITY

FIELD OF THE DISCLOSURE

The present disclosure relates to the fields of hydrocarbon exploration, development and production. In one particular arrangement, the present disclosure describes a system and workflow for predicting radioactivity characteristics, and more particularly, spectral gamma ray logs, of underground formations to evaluate the productivity of a reservoir.

BACKGROUND OF THE DISCLOSURE

Subsurface modelling can be implemented in hydrocarbon exploration, development or production. Subsurface models can be generated based on measured data that includes, for example, well log data, well test data, production data, or any other data that can be used to model physical properties in one or more subsurface regions. The measured data can include coordinate data or elevation data associated with, for example, well log data, well test data, seismic data or production data. The subsurface models can represent subsurface regions, including structures, cavities, faults, volumes, areas, material properties, or fluid properties. The subsurface models can represent measured data or interpreted data for each subsurface region. The subsurface models can represent material or fluid properties such as, for example, temperature, pressure, density, porosity, permeability, fluid content, volume, flow rate, or viscosity in the subsurface regions. The subsurface models can include, for example, geological models, petrophysical models, reservoir models and the like. The subsurface models can be employed in determining optimal placement of wells in the field.

Clay content is known to have a direct impact on hydrocarbon productivity. Permeability is usually measured in static phase under either steady state flow, pulse-decay or crushed rock methods measured from core samples in a laboratory. In the dynamic phase, permeability measurements are completely dependent on the data acquisition during logging operations. The major main factor to quantify clay content is to acquire spectral gamma ray logs. Due to the operational and technological obstructions spectral gamma ray logs are challenging to obtain for all wells. Lack of spectral gamma ray logs adds to uncertainty in the petrophysical model and limits the model's ability to calculate permeability of a well.

It is with respect to these and other considerations that the disclosure herein is presented.

SUMMARY OF THE DISCLOSURE

According to an aspect of the present disclosure, computer implemented method of evaluating a subsurface region of the earth for hydrocarbon exploration, development, or production is provided. The method includes receiving, into a processing system, measured information for a plurality of wells within the subsurface region. In particular, the measured information includes core log data and basic well log data comprising neutron log data, total gamma ray log data, and density log data measured for each of the wells respectively. Additionally, for each a plurality of training wells among the wells, the measured information includes spectral gamma ray log data respectively measured for each of the training wells. The basic well log data and spectral gamma ray log data respectively measured for each of the training wells defines training information.

The method further includes generating a model to predict synthetic spectral gamma ray log data from the basic well log data. More specifically, generating the model includes, defining model parameters including main inputs and associate inputs to the model. Three main inputs comprise total gamma ray log data, neutron log data, and density log data. Three associated inputs comprise spectral gamma ray log data representing levels of potassium, thorium, and uranium, respectively. Defining model parameters also includes assigning a respective weight to each of the three main inputs.

The step of generating the model also includes training the model by analyzing the training information according to the model parameters using machine learning and multi resolution graph clustering (MRGC) techniques, and generating a neural network statistically linking patterns in the main inputs to patterns in the associated inputs.

The method further includes the step of applying the model to predict synthetic spectral gamma ray log data for a given well lacking measured spectral gamma ray log data. In particular, applying the model includes inputting into the model, as the three main inputs, the neutron log data, total gamma ray log data, and density log data measured for the given well. The applying step also includes predicting, by the model based on the three main inputs, synthetic spectral gamma ray log data representing levels of potassium, thorium, and uranium, respectively, for the given well.

The method further includes the step of quantifying, with the processing system based on the synthetic spectral gamma ray log data for the given well, a clay content for the given well.

According to a further aspect, a system for evaluating a subsurface region of the earth for hydrocarbon exploration, development, or production is disclosed. The system comprises a computing device including a non-transitory storage medium, and an interface for receiving measured information for a plurality of wells within the subsurface region. The measured information includes core log data and basic well log data, the basic well log data comprises neutron log data, total gamma ray log data, and density log data measured for each of the wells respectively. Moreover, for each a plurality of training wells among the wells, the measured information includes spectral gamma ray log data respectively measured for each of the training wells. The basic well log data and spectral gamma ray log data for the training wells defines training information.

The system further comprises a processor, which is configured by executing code that is in the form of one or more modules stored in the non-transitory storage medium. The one or more modules configure the processor to implement a model for predicting synthetic spectral gamma ray log data from basic well log data. The model has defined model parameters including three main inputs, three associated inputs and weights assigned to each of the three main inputs respectively. In particular, three main inputs comprise total gamma ray log data, neutron log data, and density log data, respectively. Three associated inputs comprise spectral gamma ray log data representing levels of potassium, thorium, and uranium, respectively.

The model is trained by analyzing the training information according to the model parameters using machine learning and multi resolution graph clustering (MRGC) techniques, and generating a neural network statistically linking patterns in the main inputs to patterns in the associated inputs.

The one or more modules further configure the processor to apply the model to predict synthetic spectral gamma ray log data for a given well among the wells that is lacking measured spectral gamma ray log data. In particular, applying the model includes inputting into the model, as the three main inputs, the neutron log data, total gamma ray log data, and density log data measured for the given well, and predicting, by the model based on the three main inputs, the synthetic spectral gamma ray log data for the given well representing levels of potassium, thorium, and uranium, respectively. The one or more modules also configure the processor to quantify, based on the synthetic spectral gamma ray log data for the given well, a clay content for the given well.

These and other aspects, features, and advantages can be appreciated from the accompanying description of certain embodiments of the disclosure and the accompanying drawing figures and claims.

BRIEF DESCRIPTION OF THE DRAWINGS

The foregoing and other features of the arrangements of the present disclosure will be more readily apparent from the following detailed description and drawings of an illustrative embodiment of an invention encompassed by the disclosure.

DESCRIPTION OF CERTAIN EMBODIMENTS OF THE DISCLOSURE

Figure 1A:
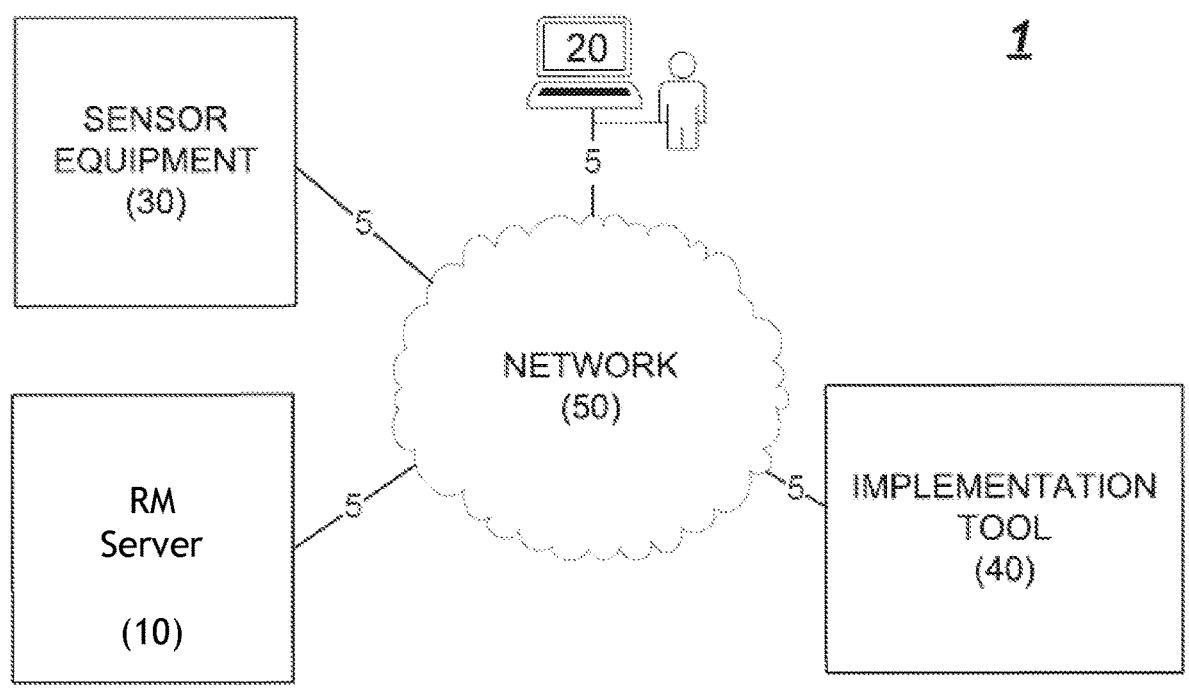
FIG. 1A shows an example of a formation evaluation and modelling (FE) system 1, constructed according to the principles of the disclosure.

The disclosure and its various features and advantageous details are explained more fully with reference to the non-limiting embodiments and examples that are described or illustrated in the accompanying drawings and detailed in the following description. It should be noted that features illustrated in the drawings are not necessarily drawn to scale, and features of one embodiment may be employed with other embodiments as those skilled in the art would recognize, even if not explicitly stated. Descriptions of well-known components and processing techniques may be omitted so as to not unnecessarily obscure the embodiments of the disclosure. The examples are intended merely to facilitate an understanding of ways in which the disclosure may be practiced and to further enable those skilled in the art to practice the embodiments of the disclosure. Accordingly, the examples and embodiments should not be construed as limiting the scope of the disclosure. Moreover, it is noted that like reference numerals represent similar parts throughout the several views of the drawings.

Subsurface modelling can be implemented in hydrocarbon exploration, development or production. Subsurface models can be generated based on information that includes, for example, core data, well log data, well test data, seismic data, production data, or any other data that can be used to model physical properties in one or more subsurface regions. The information can include coordinate data or elevation data associated with, for example, core log data, well log data, well test data, seismic data or production data. The subsurface models can represent subsurface regions, including structures, cavities, faults, volumes, areas, material properties, or fluid properties. The subsurface models can represent measured data or interpreted data for each subsurface region. The subsurface models can represent material or fluid properties such as, for example, temperature, pressure, density, porosity, permeability, fluid content, volume, flow rate, or viscosity in the subsurface regions. The subsurface models can include, for example, geological models or reservoir models. The subsurface models can be employed in determining optimal placement of wells in the field and for targeting the most productive locations within a reservoir.

Well logging, also known as borehole logging, is the practice of making a detailed record (a well log) of the characteristics of geologic formations penetrated by a borehole as a function of position. The well log can comprise core logs, generated based on the measurement of or visual inspection of core samples brought to the surface. Well logs can also comprise measurements made by instruments lowered into the hole, referred to as dynamic logs. Such log data can be measured at varied depths in a well that traverses the geological formation and thus is measured at different locations or depths in the geological formation corresponding to such well depths.

As would be understood, dynamic logs are generated by passing well logging tools through a borehole and capturing measurements and information concerning the rock facies and fluid properties surrounding the borehole and corresponding depth. The information is traditionally collected in "log" form, e.g., a table or chart of measured data values as a function of the instrument position (e.g., depth in the borehole).

Many downhole measurement techniques are known in the art, including passive measurements such as measuring the natural emission of gamma rays and active measurements, which are obtained by emitting some form of energy into the formation and measuring the response. Active measurements include using acoustic waves, electromagnetic waves, electric currents, and nuclear particles.

Porosity logs represent the fraction or percentage of pore volume in a volume of rock. Most porosity logs are generated use either acoustic or nuclear technology. Acoustic logs measure characteristics of sound waves propagated through the well-bore environment. Nuclear logs are measured as a function of nuclear reactions that take place in the downhole logging instrument or in the formation. Nuclear logs include density logs and neutron logs, as well as total gamma ray logs.

For example, and without limitation, total gamma ray logs typically represent the natural radioactivity of the formation along the borehole, particularly, a count of incoming gamma rays from the formation. Gamma rays are a form of electromagnetic radiation arising from the radioactive decay of atomic nuclei, generally in the energy range 0.1 to 100 MeV. Conventional gamma ray logging sondes typically record the total flux of gamma radiation integrated over all energies emanating from a formation as a single count rate.

For example, and without limitation, neutron logging involves the output of neutrons, from a probe, into the formation and the recording, by a detector, of either the reduction in energy of these particles (neutron—neutron logging) or the gamma rays emitted from the strata as a result of neutron capture (neutron—gamma logging). The neutron log is sensitive mainly to the amount of hydrogen atoms in a formation and its main use is in the determination of the porosity of a formation.

For example, and without limitation, a density logging tool measures the bulk density of a formation by bombarding it with a radioactive source and measuring the resulting gamma ray count after the effects of Compton Scattering and Photoelectric absorption. This bulk density can then be used to determine porosity.

Spectral gamma ray logs are an enhancement to natural gamma ray logging techniques in that the logging tool is configured to count energy levels of incoming gamma rays in a series of energy windows, and the energy spectrum is converted to count rates for potassium, thorium, and uranium. Rock are naturally radioactive, as a result of containing potassium, thorium and uranium isotopes. Therefore, the clay content within a formation can be determined from the quantification of those isotopes.

By way of overview and introduction, the present application describes computer implemented formation evaluation and modelling (FE) systems and workflows for predicting underground formation properties that affect the productivity of a well and, more generally, a subsurface region. The methodology incorporates a process and workflow to evaluate the quantification of mineralogy that impact hydrocarbon production. Embodiments of the present disclosure implement a machine learning and big data-based workflow to generate synthetic (i.e., predicted) radioactive properties of the rocks that make up the formation. The generated data set is then used to evaluate multiple formation properties including a hydrocarbon productivity index. As a result, the FE systems and associated methods can effectively reduce operational cost/time and increase the value of the formation evaluation.

Clay content is known to have a direct impact on permeability of formations and thus hydrocarbon productivity. Permeability is usually measured in static phase, which refers to the process of capturing measurements using spectral gamma ray measuring tools in the lab, under either steady state flow, pulse-decay or crushed rock method. In the dynamic phase, which refers to the process of measuring and generating well logs by lowering spectral gamma ray measuring tools into the borehole, permeability measurements are completely dependent on the data acquisition during logging operations. At present, the main factor for quantifying clay content, and thus permeability, is to acquire spectral gamma ray logs. However, due to operational and technological obstructions, spectral gamma ray logs are challenging to obtain for all wells, whether existing or under development. The lack of spectral gamma ray logs jeopardizes the ability of petrophysical models to calculate permeability in the dynamic phase and adds to the model's uncertainty. Therefore, the systems and methods for prediction of synthetic spectral gamma ray logs using machine learning and basic log data with low margin of error are needed to fill the gap and enable more accurate calculation of formation productivity.

The FE systems and methods utilize a machine learning system, more particularly, a Multi-Resolution Graph-based Clustering (MRGC) approach, that gathers its knowledge by recognizing patterns in measured well logs by means of non-parametric K-nearest-neighbor and graph data representation. More specifically, embodiments of the FE systems and methods using MRGC are trained to predict synthetic logs, particularly, synthetic spectral gamma ray logs. This is performed utilizing all available log data and integrating machine learning capabilities to train and actively improve the predictive model. Put another way, the FE systems and methods utilize conventional/basic dynamic formation evaluation data (e.g., total gamma ray logs, density and neutron logs) and use machine learning to predict advanced radioactive formation log data (e.g., synthetic spectral gamma ray logs) and further utilize the outputs as a hydrocarbon productivity indicator. In an embodiment, the trained predictive model can be applied on a field-by-field basis, to increase the accuracy and eliminate anomalies that can be associated with different formations encountered.

In many challenging formations drilled, lack of inputs can be an issue. Accordingly, in accordance with embodiments of the disclosure, a machine learning system can be configured to correlate commonly-acquired well logging operations at a given well depths (such as density, neutron and total gamma ray log data) to spectral gamma ray log data at the given well depth. Accordingly, by predicting spectral gamma ray logs, the FE systems and methods feed more inputs into petrophysical modelling systems, which vastly improves completion decision making when targeting the most productive locations within a reservoir.

Figure 1B:
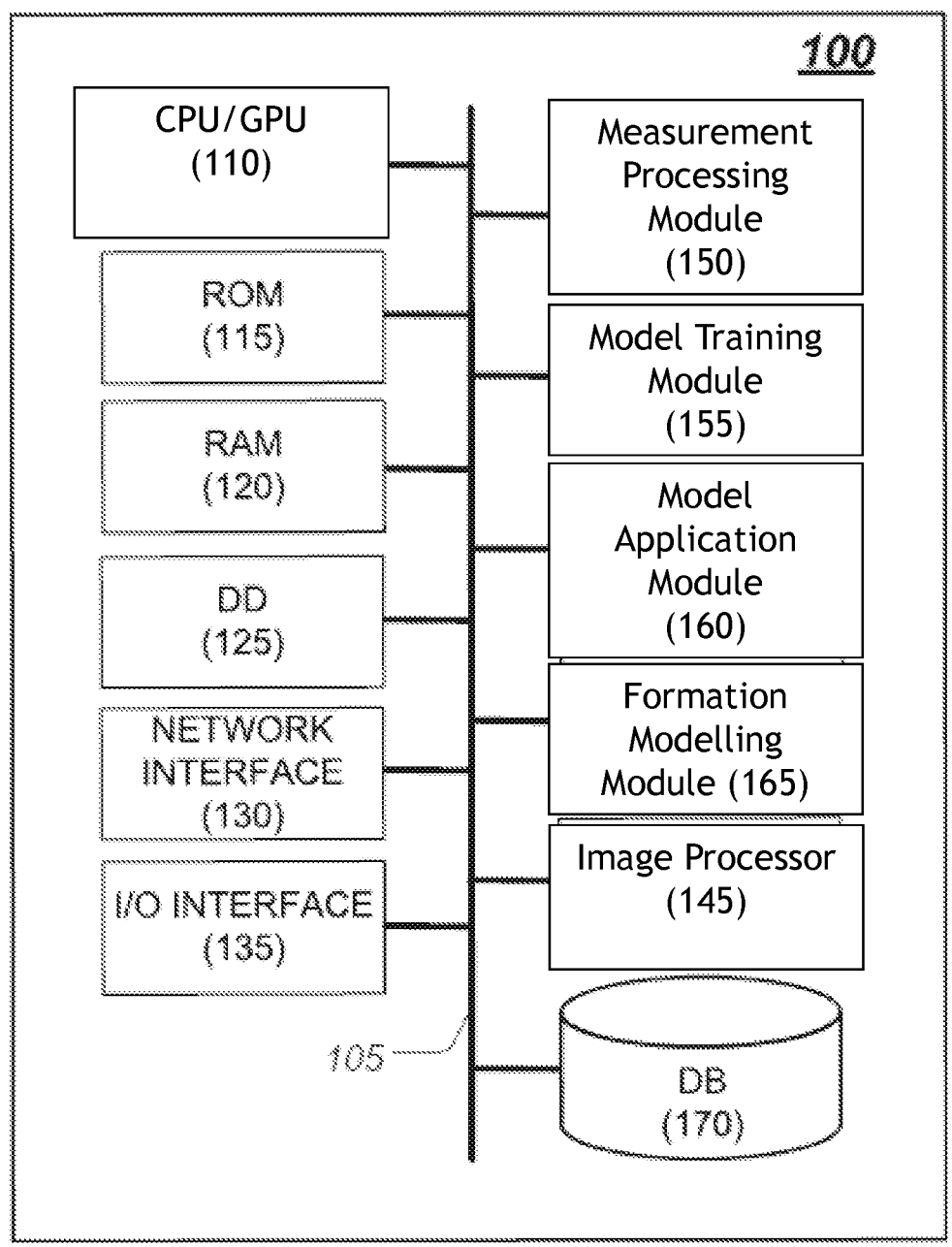
FIG. 1B shows an example of a processor used in the FE system of FIG. 1A according to the principles of the disclosure.

FIG. 1A shows an example of a FE system 1, constructed according to the principles of the disclosure. FIG. 1B shows a non-limiting embodiment of a modelling processor 100 that can be included in the FE server 10 (shown in FIG. 1A). As shown in FIG. 1A, The FE system 1 includes a FE server 10 and a communicating device 20. The FE system 1 can include sensor equipment 30, an implementation tool 40, or a network 50. The various components in the FE system 1 can be communicatively coupled to each other directly via communication links 5, or via communication links 5 and the network 50.

The FE server 10 can include a FE processor 100 (shown in FIG. 1B). The FE server 10 can receive input data directly or via the network 50 from land or marine surveys that can be carried out using the sensor equipment 30. The received input data can include well log data, such as dynamic well logging measurement data, core data, production data, and other available data that is useable to model a subsurface region.

The received dynamic log data can include "basic" or "conventional" log data, including, for example and without limitation, total gamma ray logs, neutron logs and density logs captured for respective wells. When available, the well log data can also include advanced well log data, including, for example and without limitation, spectral gamma ray logs measured for at least a subset of wells.

The sensor equipment 30 can include, for example, logging tools, such as a gamma ray logging tool, a neutron logging tool, density logging tool, geophone, seismometer, or other wave energy emitting/sensing devices, or other tools and measurement devices used to measure the various characteristics of the formation. A person having ordinary skill in the art will understand that various well logging tools are commercially available from various manufacturers and can be used for collection of data that may be input into various embodiments described in this disclosure. Additionally, a person having ordinary skill in the art will understand that there are literature documents that describe various logging tools and their operation, including the data that may be obtained from such tools. Therefore, the various logging tools described herein (e.g., neutron, gamma ray, spectral gamma ray, and density logging tools) and the operation of those tools is understood by a person having ordinary skill in the art.

The implementation tool 40 can include, for example, a drilling or casing rig (not shown) for drilling or casing boreholes, or a well system for extracting resources from the underground formation. The implementation tool 40 can be fully automated. The implementation tool can include human control. The implementation tool 40 can be positioned at a geographic location and depth based on coordinates determined by the FE server 10.

FIG. 1B shows an example of the FE modelling processor 100, constructed according to the principles of the disclosure. The processor 100 can receive input data S1, S2, . . . Sm (where m is a positive integer greater than 2). The processor 100 can output associated data that is derived from the input data A1, A2, . . . An (where n is a positive integer greater than 2, and where n can be the same as or different from m). The sensor data or associated data can be received or transmitted over the communication link 5 (shown in FIG. 1A). The processor 100 can carry out a FE process shown in FIGS. 2 and 3 to predictively quantify radioactive properties of the rocks, and further quantify various formation properties such as clay content, permeability and an associated hydrocarbon productivity index.

Figure 2:
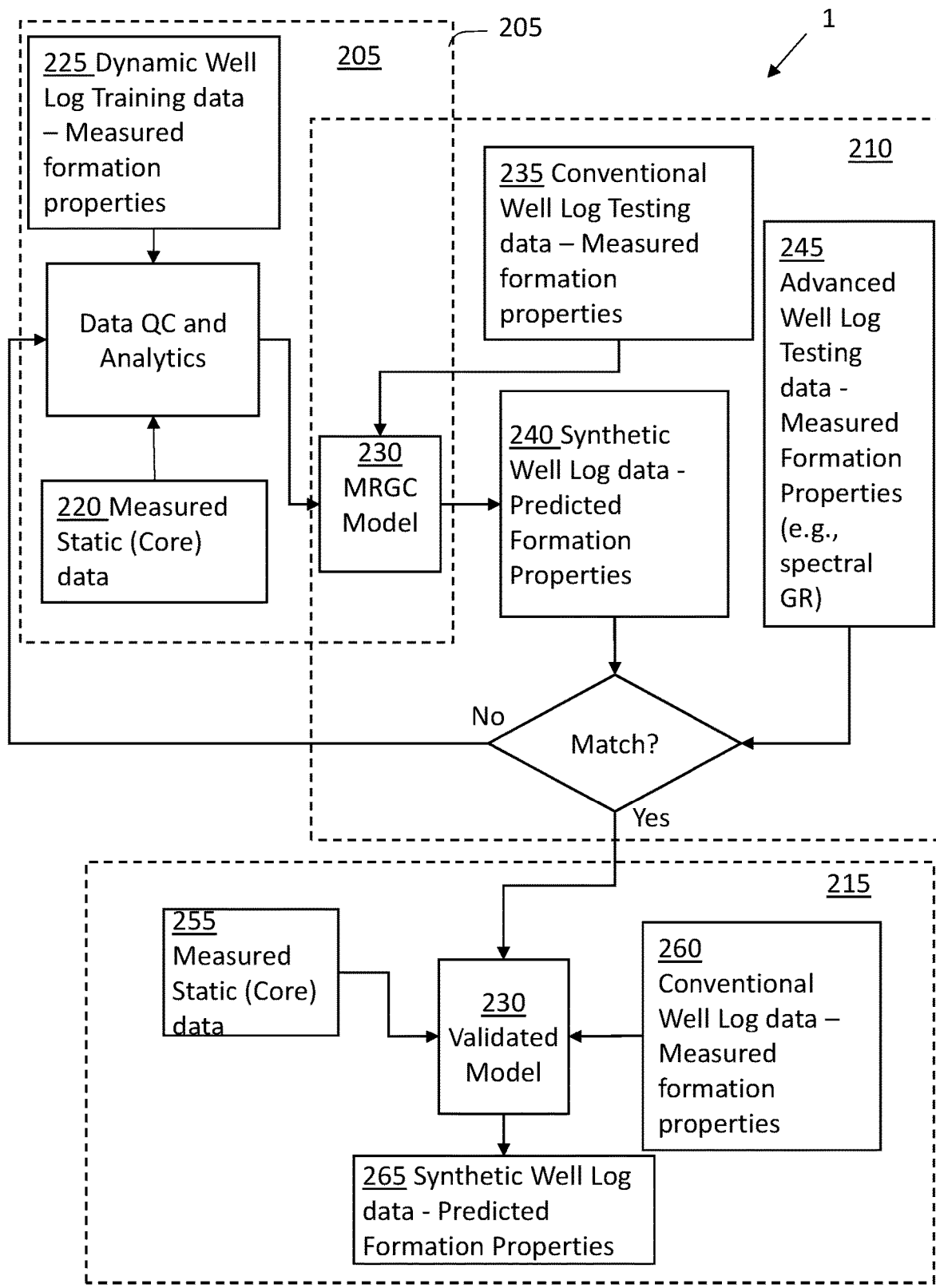
FIG. 2 is a high-level conceptual block diagram illustrating an exemplary configuration of functional blocks and operations of a FE workflow implemented by the FE system of FIG. 1A according to the principles of the disclosure.

FIG. 1B shows a non-limiting embodiment of a modelling processor 100 that can be included in the FE server 10 (shown in FIG. 1A). As seen in FIG. 2, the processor 100 can include a computer processor 110 such as a computer processing unit (CPU), a read-only memory (ROM) 115, a random-access memory (RAM) 120, a disk drive (DD) 125, a network interface 130, an input/output (I/O) interface 135, and a database (DB) 170. The various components in the processor 110 can be connected to a bus 105 via one or more communication links. The processor 100 can receive the input (e.g., sensor) data S1, S2, . . . Sm via, for example, the network interface 130, I/O interface 135, DD 125, or the DB 170.

The system bus 105 can be any of several types of bus structures that can further interconnect to a memory bus (with or without a memory controller), a peripheral bus, and a local bus using any of a variety of commercially available bus architectures.

The CPU 110 can be any of various commercially available processors. Dual microprocessors and other multi-processor architectures can also be employed as the CPU 110. The CPU 110 can also be a graphics processing unit (GPU).

The processor 100 includes a computer-readable medium that can hold executable or interpretable computer code (or instructions) that, when executed by the CPU 110, cause the described steps, processes and methods to be carried out. The computer-readable medium can be provided in the ROM 115, RAM 120, DD 125, DB 170, or an external computer-readable medium connected to the processor 100 via the network interface 130 or the I/O interface 135. The computer readable medium can include functional modules, for instance, sections of computer code that, when executed by the CPU 110 cause the steps of FE workflow (e.g., operations illustrated in FIG. 2 and the method 300 shown in FIG. 3) to be carried out, and all other process steps described or contemplated in the description.

A basic input/output system (BIOS) can be stored in a non-volatile memory in the processor 100, such as, for example, the ROM 115. The ROM 115 can include a ROM, an erasable programmable read-only memory (EPROM), or an electrically erasable programmable read-only memory (EEPROM). The BIOS can contain the basic routines that help to transfer information between components within the processor 100, such as during start-up. The RAM 120 can include a high-speed RAM such as static RAM for caching data.

The disk drive (DD) 125 can include a hard drive, such as, for example, an enhanced integrated drive electronics (EIDE) drive, or a serial advanced technology attachments (SATA) drive. The DD 125 can include an optical disk drive that can read/write from/to a compact disk read-only memory (CD-ROM) disk (not shown), or read from or write to other high capacity optical media such as a digital video disk (DVD). The DD 125 can be configured for external use in a suitable chassis (not shown). The DD 125 can be connected to the system bus 105 by a hard disk drive interface (not shown) and an optical drive interface (not shown), respectively. The hard disk drive interface (not shown) can include a Universal Serial Bus (USB) (not shown) or an IEEE 1394 interface (not shown) for external applications.

The DD 125 and associated computer-readable media can provide nonvolatile storage of data, data structures, or computer-executable instructions. The DD 125 can accommodate the storage of any data in a suitable digital format. The DD 125 can include one or more apps that are used to execute aspects of the architecture described in this specification.

A number of program modules can be stored in the DD 125, ROM 115, or RAM 120, including an operating system (not shown), one or more application programs (not shown), other program modules (not shown), and program data (not shown). Any (or all) of the operating system, application programs, program modules, and program data can be cached in the RAM 120 as executable sections of computer code.

The network interface 130 can be connected to the network 50 (shown in FIG. 1A). The network interface 130 can include a wired or a wireless communication network interface (not shown) or a modem (not shown). When used in a local area network (LAN), the processor 100 can be connected to the LAN network through the wired or wireless communication network interface; and, when used in a wide area network (WAN), the processor 100 can be connected to the WAN network through the modem. The modem (not shown) can be internal or external and wired or wireless. The modem can be connected to the system bus 105 via, for example, a serial port interface (not shown).

The I/O interface 135 can receive commands and data from an operator via a user interface device (not shown), such as, for example, a keyboard (not shown), a mouse (not shown), a pointer (not shown), a microphone (not shown), a speaker (not shown), or a display (not shown). The received commands and data can be forward to the CPU 110 from the I/O interface 135 as instruction and data signals via the bus 105.

Also shown in FIG. 1B the processor 100 includes a measurement processing module 150, model training module 155, model application module 160, and formation modeling module 165, which can each be a hardware-based device or a software module or a combination of the foregoing. As described herein, the measurement processing module 150 configures the processor to perform various operations relating to receiving, analyzing and processing the input information that can be utilized to model various formation properties. The model training module 155 configures the processor to generate and train the model(s) for predicting synthetic spectral gamma ray log data from various inputs. The model application module 160 configures the processor to implement the trained model for predicting synthetic spectral gamma ray log data. The formation modeling 165 module configures the processor to evaluate one or more of a variety of formation properties based on measured information and predicted/synthetic data and using suitable subsurface formation modelling techniques.

The image processor/driver 145 can include an image processing device, graphics driver (not shown), a video adaptor (not shown), or any other device necessary to process, generate and render an image signal on a display device, such as, for example the display device in the communicating device 20 (shown in FIG. 1A). It should be understood that one or more of the measurement processing module 150, model training module 155, model application module 160, formation modeling module 165, and image processor 145 can be integrated with the CPU 110 or provided separately, as seen in FIG. 1B. Furthermore, one or more of the foregoing can be in the form of instructions stored on one of the computer readable storage mediums and executable in the CPU.

FIG. 2 is a high-level conceptual diagram illustrating the interrelationship between various aspects of the FE system 1, operations performed in accordance with the FE workflow 300 (FIG. 3) and various data elements used or generated in accordance with the operations described herein. FIG. 2 illustrates three main phases of operation for the FE system, namely, model building 205, model testing 210 and model application 215.

Within the model building phase 205, training data including measured static coring data 220 (e.g., core logs) and dynamic logs 225 representing measured formation properties (e.g., conventional neutron, total gamma, density logs) are obtained. The training data includes advanced logs comprising spectral gamma ray logs for a subset of training wells. Such logs can be generated in the static phase (e.g., core measurement/logging) and/or dynamic phase (e.g., downhole measurements). During model building, a training data set is selected, quality checked, and used to train one or more models 230 for predicting spectral gamma ray logs from conventional log data using MRGC techniques.

During the model testing phase 210, measured coring parameters (e.g., core logs) and measured dynamic logs (e.g., conventional dynamic logs) for respective wells are input into the trained model(s) and synthetic spectral gamma ray logs are predictively generated and output by the model(s). Preferably, the test data comprises different data sets than those used to train the model(s). The synthetic spectral gamma ray logs 240 output by the model(s) for respective wells are compared to actual spectral gamma ray logs 245 measured for the respective test wells to verify whether the model(s) 230 can predict synthetic spectral gamma ray log measurements with a requisite degree of accuracy. Provided the synthetic spectral gamma ray logs sufficiently match the actual spectral gamma ray logs, the model(s) are validated for use in the model application phase.

In the model application phase 215, inputs that can comprise measured coring parameters 255 and conventional well log data 260, including neutron, natural gamma and total density logs are input to the validated model 230 and the validated model generates and outputs synthetic spectral gamma ray logs 265. Once synthetic spectral gamma ray logs are generated, a full petrophysical lithology model (not shown) can be calculated based on the model outputs and other inputs. In particular, the petrophysical lithology model can be used to quantify various formation properties, preferably including clay content, which directly works as a permeability indicator, and which leads to the inference of hydrocarbon productivity as a further result. Formation properties are related to the properties of the matrix of lithology within the formation.

Figure 3:
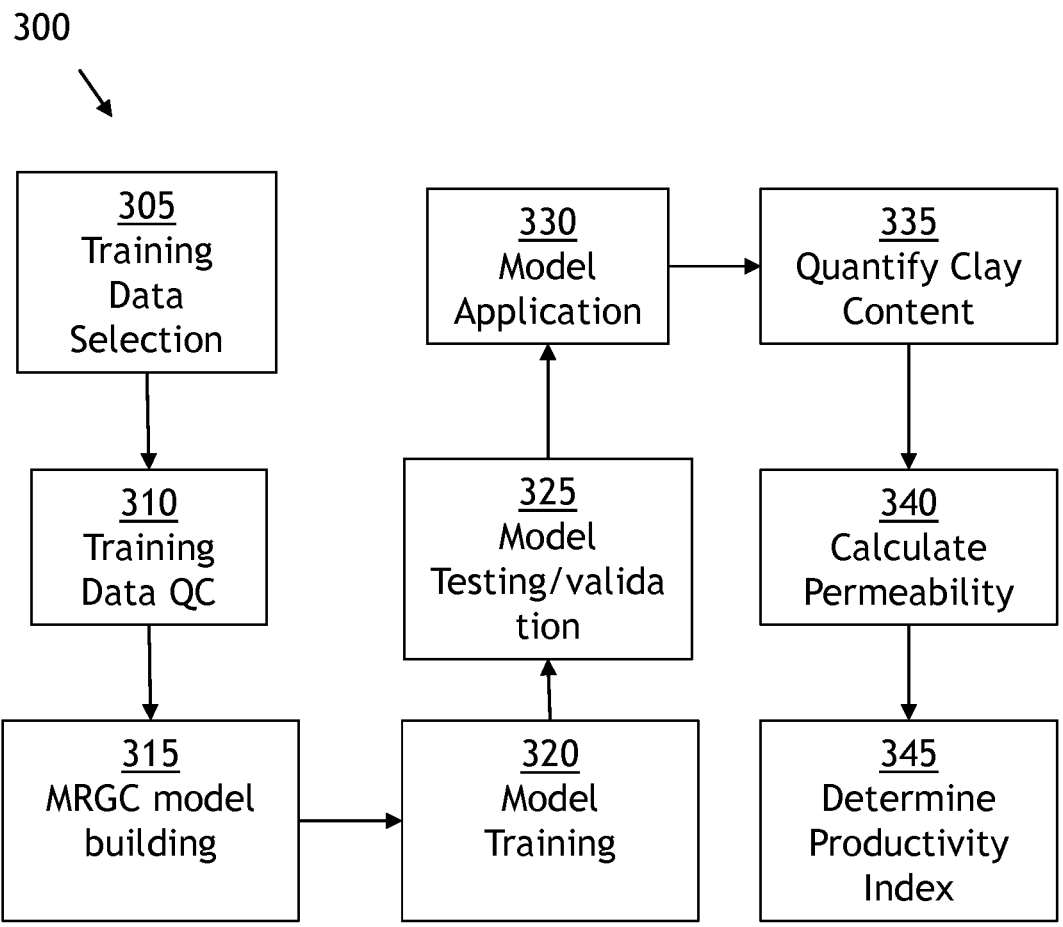
FIG. 3 is a process flow diagram illustrating operations of a FE workflow implemented by the FE system of FIG. 1A according to the principles of the disclosure.

FIG. 3 provides a process flow diagram illustrating the steps of the FE workflow 300 performed by the FE processor 100 of the FE system 1 in accordance with one or more of the disclosed embodiments. More specifically, FIG. 3 illustrates exemplary steps by which the FE processor 100 uses machine learning techniques and the MRGC methodology to generate the model for predicting synthetic spectral gamma ray logs, among other steps of the testing and application phases described in connection with FIG. 2.

At step 305 training information is obtained and selected. In embodiments, the processor 100, which is executing one or more of the modules including, for example, the measurement processing module 150 (FIG. 1B), is configured to select raw logs from among a large quantity of acquired core and dynamic log data. More specifically, training information is obtained for each well among a sub-set of wells referred to as training wells. Training wells can be selected based on a specific field and formation criteria. For each of the training wells, the training information comprises dynamic well log data representing formation properties measured using well logging tools. In an embodiment, the dynamic well log data for the training wells includes neutron logs, total gamma ray log, density logs and spectral gamma ray logs representing Potassium, Thorium, and Uranium dynamic logs. Training wells should have all the aforementioned inputs in order to correlate conventional log data and spectral gamma ray logs accordingly. The training information can also include static core log data representing the measured or observed properties of core samples obtained from respective training wells. Core data can be used as a parameter that can add to the accuracy of prediction but is not deemed necessary. The training information can also include petrophysical parameters that are measured or derived using the dynamic and core log data. For instance, in an embodiment, petrophysical parameters for zones within a given well determined from modeling the core and dynamic logs for one or more wells can be used as training information.

At step 310, the training information for the training wells is quality checked. For instance, in an embodiment, the processor 100, which is configured by executing one or more of the modules including the measurement processing module 150, can be configured to perform an automated analysis and filtering process aimed at detecting possible out-of-trend wells, and a homogeneous petrophysical revision can be carried out within a time-efficient template. Additionally, the training wells information can be filtered for mismatch, gaps, inconsistent acquisition and depth audit. Core data can be quality checked in the model building phase and used for validating the error margins when compared to acquired dynamic logs. Filter parameters used to filter out out-of-trend training wells data can include a mismatch of less than desired percentage (industry dependent) between core and log measurements, or a mismatch of field/formation specific patterns of logs that can be related to the method of capture, tool failure, gaps of data during acquisitions. The purpose of filtering is to utilize, as training data, the most representative data points that can capture formation properties (lithology related). Homogenous petrophysical revision involves comparing depth consisting log characters compared to off-set wells. By way of background, Uranium tends to be a volatile element meaning its particles are mobile and can change its characters with time, thus, acquiring half of an interval of a certain well/formation then continuing the capture in a different time can add to the uncertainty of the acquisition. Accordingly, the time efficient template relates the revision process directly to Uranium behavior and time.

At step 315, the model (e.g., MRGC model 230 of FIG. 2) for predicting synthetic spectral gamma ray data from conventional logs is built. In embodiments, the processor 100, which is configured by executing one or more of the modules including the model training module 155 (FIG. 1B), is configured to generate the model by configuring the computational framework for the model and training the model. In embodiments, the generated model can comprise an artificial neural network (ANN), neural network (NN), system of ANNs or NNs or other suitable machine learning system. In embodiments, such machine learning systems are trained using MRGC techniques applied to the training information selected at step 310.

More specifically, a first step of building the model can include defining the model inputs and their associated weights. Inputs are divided into two parallel sectors, main inputs and associated inputs. Main inputs are those inputs that the model uses to predict the associated inputs. In an embodiment, the main inputs are conventional logs, namely, total gamma ray, neutron, and density logs. The associated inputs are the three elements of spectral gamma ray log data that the model is trained to predict by linking their patterns to the main inputs statistically. More specifically, the associated inputs can include spectral gamma ray log data representing levels of potassium, thorium, and uranium, respectively.

In addition, the various inputs can be weighted at step 315. For instance, in an embodiment, an order of selection of the main inputs is defined. The main input order serves to defines the respective weights by which the model will learn the patterns in the main inputs that are useable to predict the associated inputs. In an embodiment, total gamma ray log data is selected as the first main input, followed by density log data and then neutron log data. This order results in the first main input having the greatest weight, followed by the second main input, and the third main input having the least weight. In operation, whenever those three types of main input logs are obtained in a given well, the trained model can generate predicted synthetic spectral gamma ray log data.

In addition, an interval for inputs is defined. In other words, in order to have a consistent generation of synthetic spectral gamma ray data, an interval by which data is trained match the formation/field intended for prediction is set. For instance, the wells chosen interval is across a certain sandstone formation and across the same field for consistency purposes.

Figure 4:
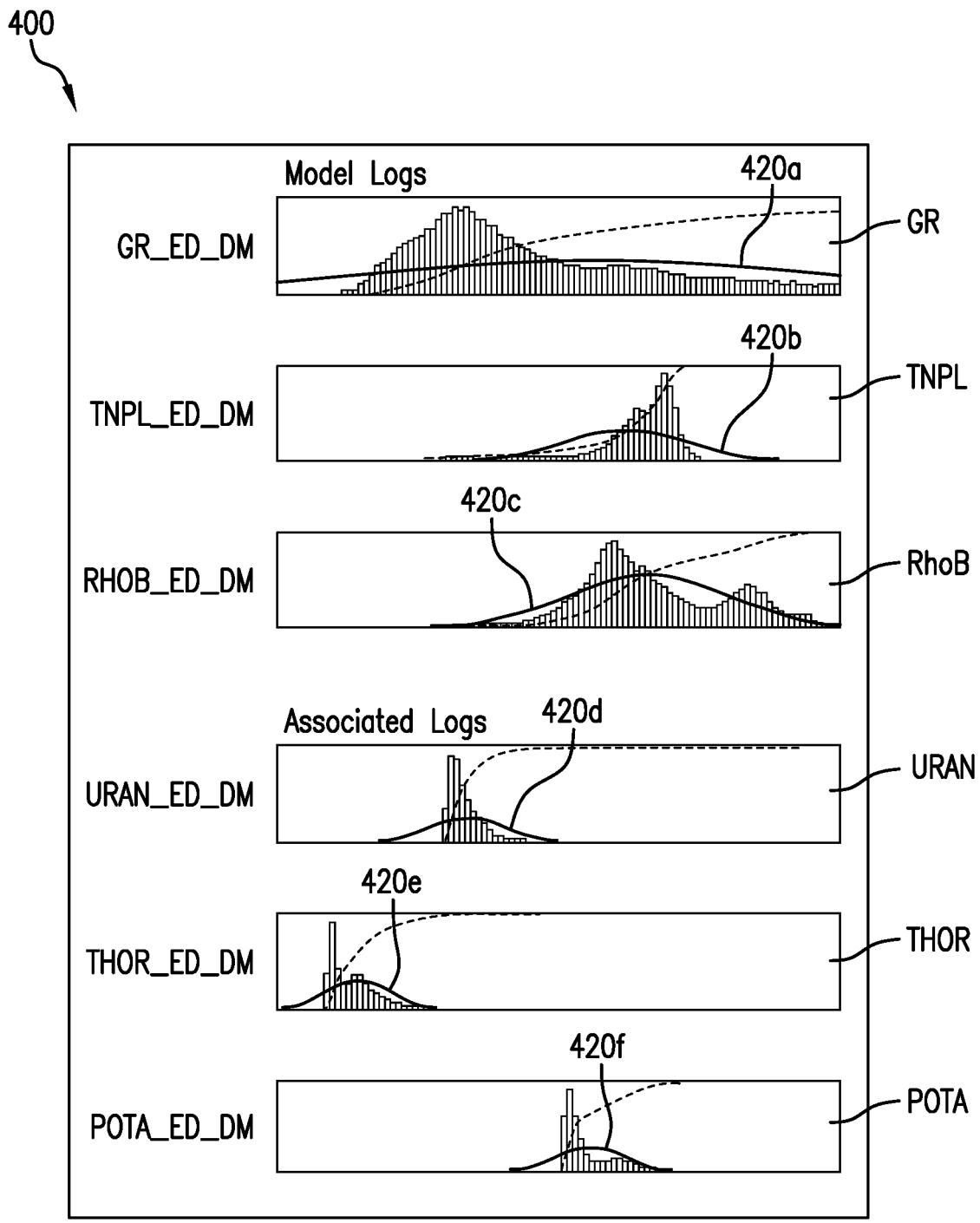
FIG. 4 is a graphical representation of chart depicting log data corresponding to the three main inputs and three associated inputs of a model for predicting synthetic spectral gamma ray data generated using the FE workflow implemented by the FE system of FIG. 1A according to the principles of the disclosure.

As noted, log data can be represented graphically in a chart showing a curve defined by a particular set of measured data values (e.g., natural gamma, neutron, and density logs) as a function of the instrument depth in the borehole. FIG. 4, for example, includes graphs 400 representing values for the main input logs comprising three logs (TNPL, RhoB, GR). RhoB corresponds to a density measurement log, TNPL is a porosity measurement log measured by a Neutron Porosity Log tool, and GR is a natural gamma radiation measurement Log (GR). FIG. 4, also includes graphs that illustrate the associated input logs comprising three measurements of a spectral gamma ray log (URAN, THOR, POTA). URAN corresponds to the uranium count, THOR corresponds to the thorium count, and POTA corresponds to the potassium count. FIG. 4 showcases main and associated inputs in terms of data point variations. More specifically, FIG. 4 displays a frequency chart showing the frequency of data vs. data points, wherein the X axis represents data and the Y represents a variation in frequency. The lines, 420a-420f respectively represent the average of data vs. frequency in terms of hyperbolic representation.

At step 320, model building continues by training the model. In embodiments, the processor 100, which is executing one or more of the modules including, for example, the model training module 155 (FIG. 1B), is configured to train the model using machine learning and MRGC techniques applied to the training information according to the model parameters defined at step 315.

MRGC is an algorithmic approach that uses non-parametric K-nearest-neighbor (KNN) and graph data representation to identify patterns in the main and associated input data and statistically link patterns in the main input data to the patterns identified in the associated input data. Accordingly, the processor using MRGC and graph-representation techniques, is configured to analyze the training information, such as the data represented by the graphs shown in FIG. 4, for each of the training wells to learn patterns of the curves defined by the main input data logs that corresponds to the curves of the selected associated input logs. The configured processor incorporates a statistical ranking method to allocate a certain pattern in the input data to a pattern of the associated data.

More specifically, KNN-based log prediction depends on both the data points and clustering and, in an embodiment, is used by the processor 100 to create a ranking of different log patterns. The nearest neighbors (K) are used for setting the normalized distance between the point to be predicted and its nearest neighbors. In an example, clustering is performed based on selection of common log patterns and off-set patterns, and twelve clusters are made. During training, wells are analyzed collectively as the processor gathers all the data from the tested wells and applies pattern recognition to rank data points. Depth is a data point that can be marked when a pattern is expected or not expected. In order to statistically correlate patterns in the first second and third main inputs to the three associated inputs, the inputs are weighted from highest weight to lowest weight. In an embodiment, the first input has the largest impact and all other inputs are weighted equally. Patterns are recognized from a statistical clustering of data points. Multigraphical clustering of data and assessing the number of clustering occurs in the MRGC phase. Then, the K-nearest neighboring method is applied for a chosen cluster and the distance between the data points are set. Both MRGC and KNN techniques are coupled to train the model. In some embodiments, core data can be used an extra auditing tool to audit for accuracy of inputs, however, core data is not necessarily used in the training process.

Figure 5:
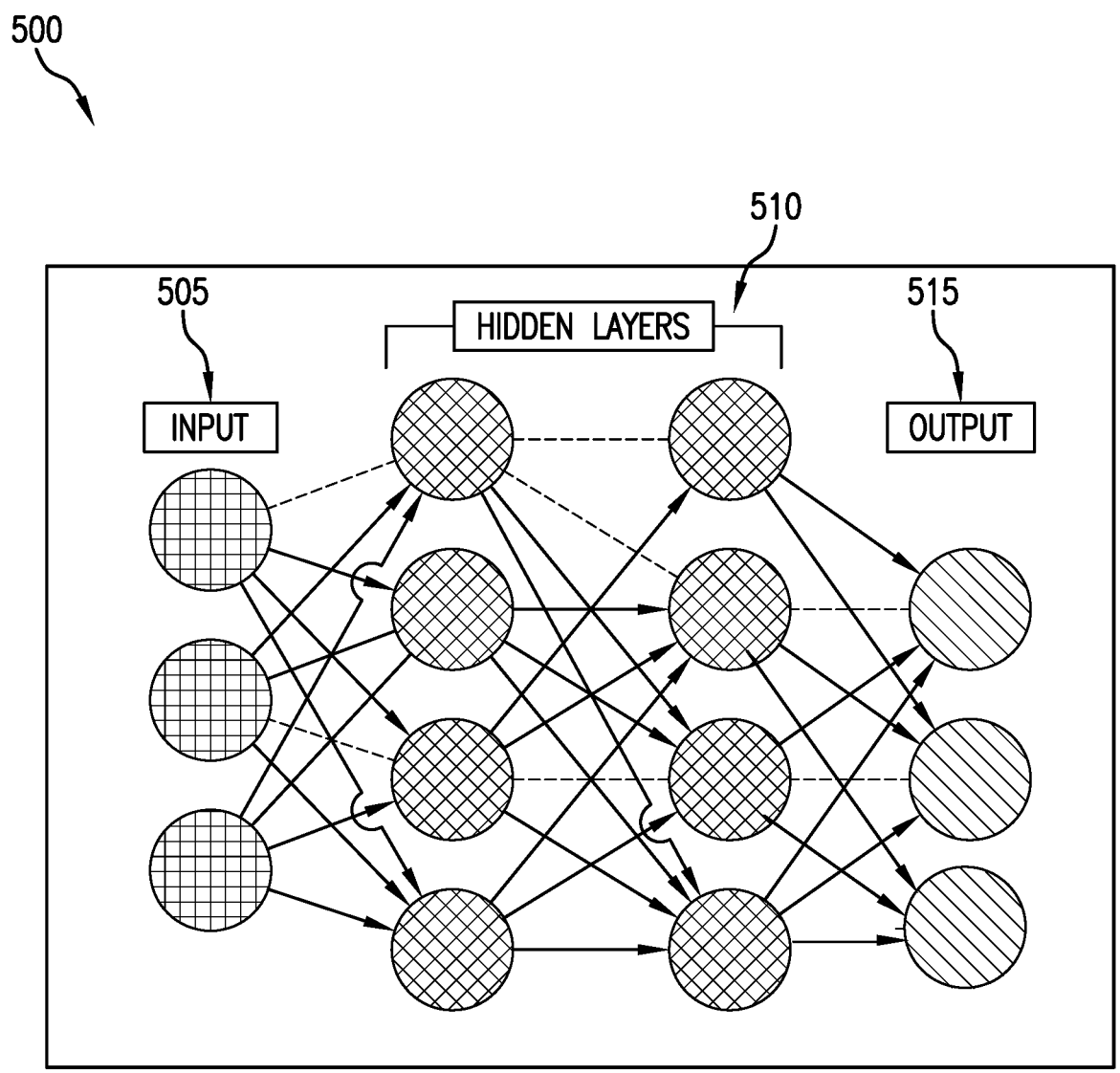
FIG. 5 is a simplified conceptual block diagram illustrating a trained predictive model for predicting synthetic spectral gamma ray data comprising a neural network generated according to the principles of the disclosure.

FIG. 5 is a simplified conceptual illustration of a trained predictive model for predicting synthetic spectral gamma ray data comprising a neural network 500 according to an embodiment. In the example shown, the input layer 505 of the neural network 500 comprises three main inputs. Two hidden layers 510 link the input layer to the output layer 515 having three associated outputs. As would be understood, the connections between the nodes of the input layer, hidden layers and the output layer are established and weighted according to the parameters defined at step 315 and the training process implemented at step 320 using MRGC techniques.

At step 325, after training is completed, the model (e.g., MRGC model 230 of FIG. 2) is tested. In embodiments, the processor 100, which is configured by executing one or more of the modules including the model application module 155 (FIG. 1B), applies the model to a blind testing data set. The blind testing data set is input to the model to simulate the situation where prediction and creation of synthetic log data for a new well is desired. The synthetic data generated by the model can then be compared to actual acquired data for validation. For instance, in a practical test of the of the exemplary FE systems and methods on a sample of 80 wells in a given field/formation, wherein 60 of the wells had the input data needed and 20 wells were utilized for blind testing, the accuracy of the synthetic spectral gamma ray data exceeded an 80 percent match to actual measurements.

More specifically, in an embodiment, conventional logs for a test well can be provided as the main inputs to the model, which outputs the associated outputs, namely, the synthetic spectral gamma ray log data predicted based on the main inputs. The synthetic spectral gamma ray log output by the model can then be compared to actually measured spectral gamma ray logs for the test well to determine whether the model predicted synthetic spectral gamma ray log measurements with a requisite degree of accuracy. Provided the synthetic spectral gamma ray logs sufficiently match the actual spectral gamma ray logs the model is validated for use in the model application phase. For instance, in an embodiment, a 75 to 80 percent match can be required to validate the model before use in the application phase.

Figure 6:
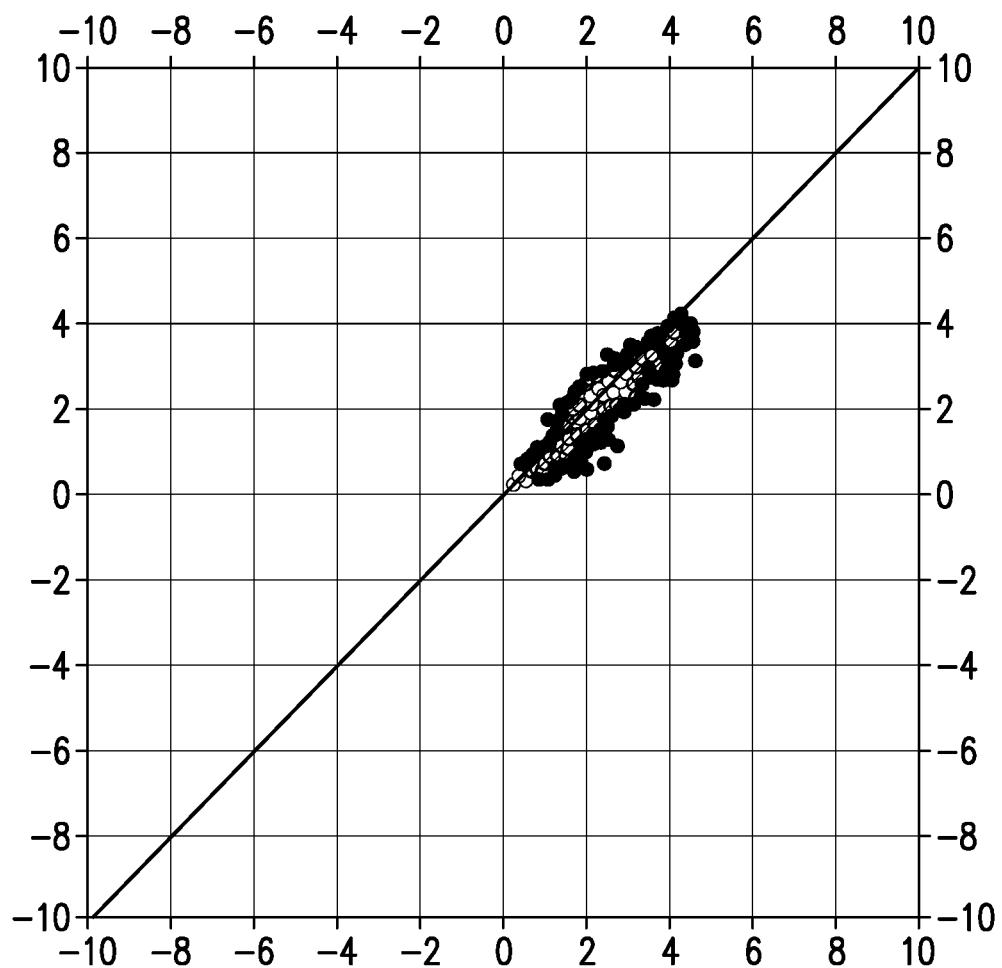
FIG. 6, is a graphical representation of data points representing margins of error for synthetic spectral gamma ray log data predicted according to the principles of the disclosure.
Figure 7:
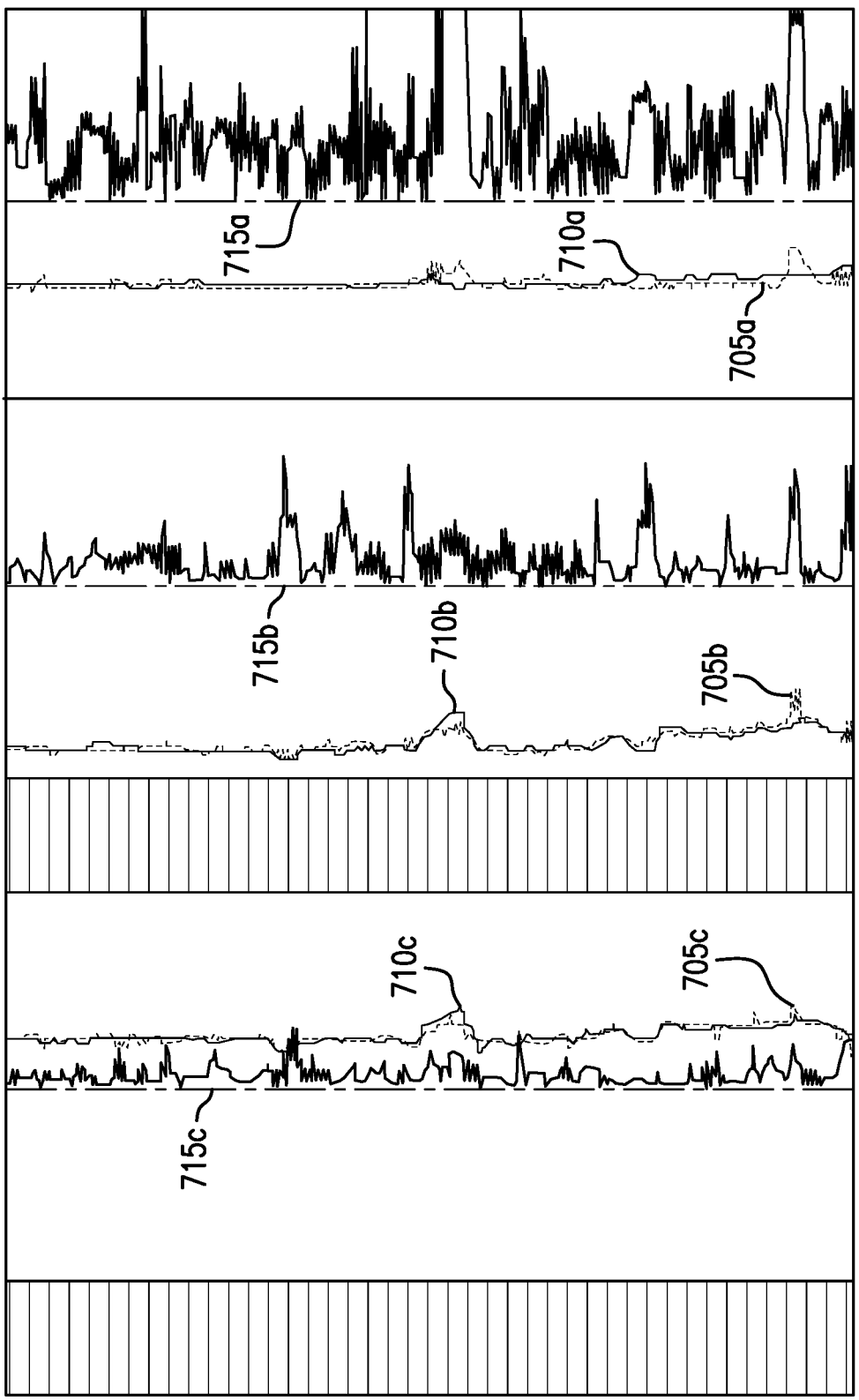
FIG. 7 is a graphical representation of acquired spectral gamma ray data overlaid with synthetic spectral gamma ray data predicted according to the principles of the disclosure.

It should be understood that testing and validation can be performed on a plurality of different test wells and varied environments. In an embodiment, blind testing the methodology on tens of drilled wells across multiple formations is performed to verify and quantify the margin of error of produced data. FIG. 6, for example, is a graphical representation of data points for identifying margins of error and validation of the model. In particular, FIG. 6 illustrates the error margin between acquired data vs. predicted data, wherein the more linear the representation the less of an error it represents. FIG. 7 is another graphical representation of acquired spectral gamma ray data 705a-705c overlaid with predicted synthetic spectral gamma ray data 710a-710c for validation purposes. Additionally, the lines 715a-715c represent the error margin, wherein the less noisy the data, the more accurate the prediction is.

If the model does not reach the threshold for validation at step 325, one or more of steps 305-320 can be repeated. For instance, step 310 can be repeated to quality check and further refine the input data and then the model training step 320 repeated using the improved training data set.

At step 330, the validated model (e.g., validated MRGC model 230 of FIG. 2) is implemented in the application phase. In embodiments, the processor 100, which is configured by executing one or more of the modules including, for example, the model application module 155 (FIG. 1B), applies the model to generate synthetic spectral gamma ray log data for one or more wells lacking actual spectral gamma ray measurements. Similar to the blind testing operation at step 325, in the model application step, main inputs comprising conventional logs including neutron, natural gamma and density logs for a given well are input into the validated model, which outputs the predicted associated inputs, namely synthetic spectral gamma ray log data.

At step 335, the synthetic log data generated by the model is used to quantify one or more parameters of the underground formation surrounding the given well. In embodiments, the processor 100, which is configured by executing one or more of the modules including, for example, the formation modelling module 165 (FIG. 1B), inputs the associated outputs into one or more petrophysical lithology models configured to quantify one or more parameters of the formation. More specifically, in an embodiment, the predicted synthetic spectral gamma ray log data is input into a petrophysical lithology model configured to quantify clay content for the given well. Inputs to the petrophysical lithology model can also include available measured well log data, core data and other information derived therefrom.

As stated, clay content exists naturally within a rock and the natural radioactivity can be measured analytically by running the spectral gamma ray log acquisition tool inside the borehole of a well. Synthetic spectral gamma ray logs similarly represent the measures of isotopes of potassium, thorium, and uranium that are useable to quantify the following minerals, Illite $(K,H_3O)(Al,Mg,Fe)_2(Si,Al)_4O_{10}$ $[(OH)_2,(H_2O)]$, Orthoclase $KAlSi_3O_8$, and Kaolinite $Al_2Si_2O_5(OH)_4$, for example. These minerals, in turn, can be used to quantify the clay content. Typically, high spectral gamma ray readings indicate high clay content and therefore decreased permeability where a low spectral gamma ray reading indicate low clay content and therefore increased permeability.

At step 340, permeability is calculated for the given well. As noted, clay content directly works as a permeability indicator, which as a further result leads to the inference of hydrocarbon productivity. Accordingly, in an embodiment, the processor 100, which is configured by executing one or more of the modules including, for example, the formation modelling module 165 (FIG. 1B), can input finalized data into a suitable model for measuring the permeability for the well. For example, finalized data can include the quantified clay content determined at step 335, actual core and well log data and synthesized or predicted data (e.g., synthetic spectral gamma ray logs) for a given well. Additionally, permeability can be measured using conventional analytical solutions from literature. Core data can also be used at step 340 as a benchmark to quantify the mineralogy of a rock and/or other empirical formulas known in the art.

At step 345, the configured processor determines a productivity index for the given well based on the clay content and associated permeability determined at steps 335-340. As would be understood, if clay is present in high volume per depth then permeability is affected which leads to a low productivity index, and vice versa. In addition, each clay element quantified per depth can lead to increased or decreased productivity index, as per literature. An indicator of productivity is an extra factor that can be used during drilling or after drilling to set an initial or a generic productivity index per zone.

Figure 8:
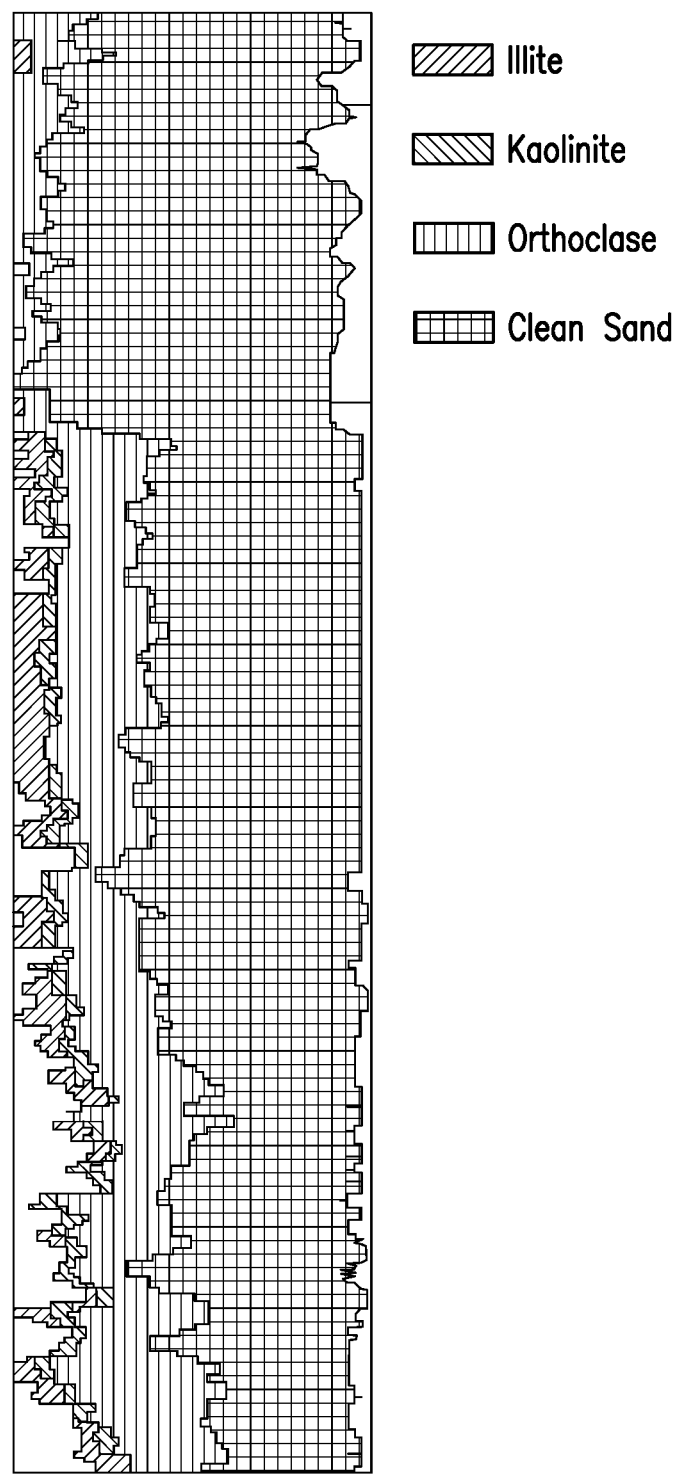
FIG. 8 is a graphical representation of quantified clay volumes populated using a calculated probabilistic petrophysical model used as a productivity indicator according to the principles of the disclosure.

As can be appreciated, the various parameters determined from multiple wells, respectively, can be combined and leveraged to model larger portions of the subsurface region. FIG. 8 is a graphical illustration of quantified clay volumes populated using a calculated probabilistic petrophysical model used as a productivity indicator. In particular, FIG. 8 illustrates the lithology types and respective quantities determined for a given well. As shown in FIG. 8 and explained by the legend, one region corresponds to Illite, a second region corresponds to Kaolinite, a third region corresponds to Orthoclase, and a fourth region corresponds to Clean Sand. As noted, the quantification of such clays is possible through actual and/or synthetic spectral gamma ray logs. Accordingly, the chart shown in FIG. 8 represents a depth (Y-axis) vs data (X-axis) in terms of volume percentage of each clay type.

Commercially there is no implemented methodology that allows for elemental radioactive data prediction from basic logs run in an oil/gas well. Embodiments of the FE systems and methods provide the means to characterize and mimic existing data across specific formation types and produce synthetic spectral gamma ray log data with a low margin of error that can be utilized to quantify clay content and therefore productivity of a given well with low uncertainty. Therefore, embodiments of the FE systems and methods serve the needs of both low uncertainty formation evaluation models and quantifiability of clay content that is used as a main hydrocarbon production indicator. By predicting spectral gamma ray logs, more inputs are provided into the petrophysical modelling solutions, which vastly improves completion decision making when targeting the preferred zones within a reservoir. Put another way, by providing accurately synthesized advanced logging inputs into formulating and applying the petrophysical model, the FE system server 10 enables a better determination of where to complete a certain well using the implementation tool 40.

The terms "a," "an," and "the," as used in this disclosure, means "one or more," unless expressly specified otherwise.

The term "communicating device," as used in this disclosure, means any hardware, firmware, or software that can transmit or receive data packets, instruction signals or data signals over a communication link. The communicating device can include a computer or a server. The communicating device can be portable or stationary.

The term "communication link," as used in this disclosure, means a wired or wireless medium that conveys data or information between at least two points. The wired or wireless medium can include, for example, a metallic conductor link, a radio frequency (RF) communication link, an Infrared (IR) communication link, or an optical communication link. The RF communication link can include, for example, Wi-Fi, WiMAX, IEEE 802.11, DECT, 0G, 1G, 2G, 3G or 4G cellular standards, or Bluetooth.

The terms "computer" or "computing device," as used in this disclosure, means any machine, device, circuit, component, or module, or any system of machines, devices, circuits, components, or modules which are capable of manipulating data according to one or more instructions, such as, for example, without limitation, a processor, a microprocessor, a graphics processing unit, a central processing unit, a general purpose computer, a super computer, a personal computer, a laptop computer, a palmtop computer, a notebook computer, a desktop computer, a workstation computer, a server, a server farm, a computer cloud, or an array of processors, microprocessors, central processing units, general purpose computers, super computers, personal computers, laptop computers, palmtop computers, notebook computers, desktop computers, workstation computers, or servers.

The term "computer-readable medium," as used in this disclosure, means any storage medium that participates in providing data (for example, instructions) that can be read by a computer. Such a medium can take many forms, including non-volatile media and volatile media. Non-volatile media can include, for example, optical or magnetic disks and other persistent memory. Volatile media can include dynamic random access memory (DRAM). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read. The computer-readable medium can include a "Cloud," which includes a distribution of files across multiple (for example, thousands of) memory caches on multiple (for example, thousands of) computers.

Various forms of computer readable media can be involved in carrying sequences of instructions to a computer. For example, sequences of instruction (i) can be delivered from a RAM to a processor, (ii) can be carried over a wireless transmission medium, or (iii) can be formatted according to numerous formats, standards or protocols, including, for example, Wi-Fi, WiMAX, IEEE 802.11, DECT, 0G, 1G, 2G, 3G, 4G, or 5G cellular standards, or Bluetooth.

The term "database," as used in this disclosure, means any combination of software or hardware, including at least one application or at least one computer. The database can include a structured collection of records or data organized according to a database model, such as, for example, but not limited to at least one of a relational model, a hierarchical model, or a network model. The database can include a database management system application (DBMS) as is known in the art. The at least one application may include, but is not limited to, for example, an application program that can accept connections to service requests from clients by sending back responses to the clients. The database can be configured to run the at least one application, often under heavy workloads, unattended, for extended periods of time with minimal human direction.

The terms "including," "comprising" and their variations, as used in this disclosure, mean "including, but not limited to," unless expressly specified otherwise.

The term "network," as used in this disclosure means, but is not limited to, for example, at least one of a local area network (LAN), a wide area network (WAN), a metropolitan area network (MAN), a personal area network (PAN), a campus area network, a corporate area network, a global area network (GAN), a broadband area network (BAN), a cellular network, or the Internet, any of which can be configured to communicate data via a wireless or a wired communication medium. These networks can run a variety of protocols not limited to TCP/IP, IRC or HTTP.

The term "server," as used in this disclosure, means any combination of software or hardware, including at least one application or at least one computer to perform services for connected clients as part of a client-server architecture. The at least one server application can include, but is not limited to, for example, an application program that can accept connections to service requests from clients by sending back responses to the clients. The server can be configured to run the at least one application, often under heavy workloads, unattended, for extended periods of time with minimal human direction. The server can include a plurality of computers configured, with the at least one application being divided among the computers depending upon the workload. For example, under light loading, the at least one application can run on a single computer. However, under heavy loading, multiple computers can be required to run the at least one application. The server, or any if its computers, can also be used as a workstation.

The term "transmission," as used in this disclosure, means the conveyance of signals via electricity, acoustic waves, light waves and other electromagnetic emissions, such as those generated with communications in the radio frequency (RF) or infrared (IR) spectra. Transmission media for such transmissions can include coaxial cables, copper wire and fiber optics, including the wires that comprise a system bus coupled to the processor.

Devices that are in communication with each other need not be in continuous communication with each other unless expressly specified otherwise. In addition, devices that are in communication with each other may communicate directly or indirectly through one or more intermediaries.

Although process steps, method steps, or algorithms may be described in a sequential or a parallel order, such processes, methods and algorithms may be configured to work in alternate orders. In other words, any sequence or order of steps that may be described in a sequential order does not necessarily indicate a requirement that the steps be performed in that order; some steps may be performed simultaneously. Similarly, if a sequence or order of steps is described in a parallel (or simultaneous) order, such steps can be performed in a sequential order. The steps of the processes, methods or algorithms described in this specification may be performed in any order practical.

When a single device or article is described, it will be readily apparent that more than one device or article may be used in place of a single device or article. Similarly, where more than one device or article is described, it will be readily apparent that a single device or article may be used in place of the more than one device or article. The functionality or the features of a device may be alternatively embodied by one or more other devices which are not explicitly described as having such functionality or features.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A computer implemented method of evaluating a subsurface region of the earth for hydrocarbon exploration, development, or production, the method comprising:
receiving, into a processing system, measured information for a plurality of wells within the subsurface region, the measured information including
core log data,
basic well log data, the basic well log data comprising neutron log data, total gamma ray log data, and density log data measured for each of the wells respectively, and
wherein, for each a plurality of training wells among the wells, the measured information includes spectral gamma ray log data respectively measured for each of the training wells, wherein the basic well log data and spectral gamma ray log data respectively measured for each of the training wells defines training information;
generating, a model comprising a neural network trained to predict synthetic spectral gamma ray log data from the basic well log data, wherein synthetic spectral gamma ray log data comprises predicted measurements of potassium, thorium, and uranium isotope levels, wherein training the model includes,
defining model parameters, the step of defining the model parameters comprising,
defining main inputs and associate inputs to the model, wherein three main inputs comprise total gamma ray log data, neutron log data, and density log data, respectively, and wherein three associated inputs comprise spectral gamma ray log data representing measured levels of potassium, thorium, and uranium isotopes, respectively, and
assigning a respective weight to each of the three main inputs, and
training the model by analyzing the training information according to the model parameters using machine learning and multi resolution graph clustering (MRGC) techniques and generating a-the neural network statistically linking patterns in the main inputs to patterns in the associated inputs comprising spectral gamma ray log data representing measured levels of potassium, thorium, and uranium;
applying the model to predict synthetic spectral gamma ray log data for a given well lacking measured spectral gamma ray log data, wherein applying the model includes:
inputting into the model, as the three main inputs, the neutron log data, total gamma ray log data, and density log data measured for the given well, and
generating, by the model based on the three main inputs, the synthetic spectral gamma ray log data comprising predicted levels of potassium, thorium, and uranium isotopes, respectively, for the given well;
quantifying, with the processing system based on the synthetic spectral gamma ray log data generated by the model for the given well, a clay content for the given well.

2. The method of claim 1, further comprising:
validating the model, wherein validating the model includes:
inputting into the model, as the three main inputs, the neutron log data, total gamma ray log data, and density log data measured for a test well among the wells, and
predicting, by the model based on the three main inputs, synthetic spectral gamma ray log data representing levels of potassium, thorium, and uranium, respectively, for the test well;
comparing the synthetic spectral gamma ray log data for the test well to actual spectral gamma ray log data measured for the test well, and determining, based on the comparison, whether the synthetic spectral gamma ray log data matches the actual spectral gamma ray log data to a prescribed degree of accuracy, and in response to determining that the synthetic spectral gamma ray log data for the test well matches the actual spectral gamma ray log data for the test well to the prescribed degree of accuracy, validating the model, and in response to determining that the synthetic spectral gamma ray log data matches the actual spectral gamma ray log data to the prescribed degree of accuracy, repeating the filtering, training and validating step until the synthetic spectral gamma ray log data for the test well matches the actual spectral gamma ray log data for the test well to the prescribed degree of accuracy.

3. The method of claim 1, further comprising:
filtering the training information based on one or more quality control parameters, wherein the training step is performed using the training information as filtered based on the one or more quality control parameters.

4. The method of claim 3, wherein the filtering step includes one or more of:
implementing a homogeneous petrophysical revision on the training information for one or more of the training wells within a time-efficient template;
comparing the training information for respective training wells to detect out-of-trend wells; and
comparing the training information for respective training wells to detect instances of mismatch, gaps, and inconsistent acquisition and depth.

5. The method of claim 1, wherein the step of analyzing the training information using MRGC includes identifying and statistically linking the patterns in the main inputs to the patterns in the associated inputs using a non-parametric K-nearest-neighbor clustering algorithm and graph data representation techniques.

6. The method of claim 1, further comprising:
generating well logs by passing well logging tools through the wells and measuring the basic well log data for one or more of the wells.

7. The method of claim 1, wherein the clay content is quantified using a petrophysical lithology model configured to quantify the clay content as a function of the synthetic spectral gamma ray log data.

8. The method of claim 7, further comprising:
calculating, with the processing system based on the clay content, a permeability for the given well, and
determining, with the processing system, a productivity index of the given well as a function of the calculated permeability.

9. The method of claim 8, further comprising:
determining with the processing system based on the productivity index, a location in the subsurface region for completion of the given well; and
extracting natural resources from the well at the location.

10. The method of claim 1, wherein quantifying the clay content comprises:
quantify a respective amount of minerals including illite, orthoclase, and kaolinite.

11. A system for evaluating a subsurface region of the earth for hydrocarbon exploration, development, or production, the system comprising:

a computing device including:
a non-transitory storage medium,
an interface for receiving measured information for a plurality of wells within the subsurface region, the measured information including core log data and basic well log data, the basic well log data comprising neutron log data, total gamma ray log data, density log data measured for each of the wells respectively, and wherein, for each a plurality of training wells among the wells, the measured information includes spectral gamma ray log data respectively measured for each of the training wells, the basic well log data and spectral gamma ray log data for the training wells defining training information,
a processor, wherein the processor is configured by executing code that is in the form of one or more modules stored in the non-transitory storage medium, wherein the one or more modules configure the processor to:
implement a model comprising a neural network trained for predicting synthetic spectral gamma ray log data from basic well log data, wherein synthetic spectral gamma ray log data comprises predicted measurements of potassium, thorium, and uranium isotope levels, the model having defined model parameters including three main inputs, three associated inputs and weights assigned to each of the three main inputs respectively,
wherein three main inputs comprise total gamma ray log data, neutron log data, and density log data, respectively, and wherein three associated inputs comprise spectral gamma ray log data representing measured levels of potassium, thorium, and uranium isotopes, respectively, and
wherein the model is trained by analyzing the training information according to the model parameters using machine learning and multi resolution graph clustering (MRGC) techniques, and statistically linking patterns in the main inputs to patterns in the associated inputs comprising spectral gamma ray log data representing measured levels of potassium, thorium, and uranium;
apply the model to predict synthetic spectral gamma ray log data for a given well among the wells that is lacking measured spectral gamma ray log data, wherein applying the model includes:
inputting into the model, as the three main inputs, the neutron log data, total gamma ray log data, and density log data measured for the given well, and
generating, by the model based on the three main inputs, the synthetic spectral gamma ray log data for the given well comprising predicted levels of potassium, thorium, and uranium, respectively; and
quantify, based on the synthetic spectral gamma ray log data generated by the model for the given well, a clay content for the given well.

12. The system of claim 11, further comprising:
one or more sensor devices in communication with the computing device via the interface, wherein the one or more sensor devices include well logging tools configured to be passed through the wells and measure the basic well log data for one or more of the wells.

13. The system of claim 11, further comprising an implementation tool for hydrocarbon exploration, development or production at a location within the subsurface region determined as a function of the clay content quantified for the given well.

14. The system of claim 11, further comprising: a display device in communication with the computing device, wherein the processor is configured to generate images representing formation properties determined as a function of the quantified clay content and output the images using the display device.

15. The system of claim 11, wherein the model comprises a neural network trained by identifying and statistically linking the patterns in the main inputs to the patterns in the associated inputs using a non-parametric K-nearest-neighbor clustering algorithm and graph data representation techniques.

16. The system of claim 11, wherein processor is configured to quantify the clay content using a petrophysical lithology model programmed to quantify the clay content as a function of the synthetic spectral gamma ray log data.

17. The system of claim 11, wherein the processor is further configured to,
- calculate, based on the clay content, a permeability for the given well, and
- determine a productivity index of the given well as a function of the calculated permeability.

18. The system of claim of claim 17, wherein the processor is further configured to
- determine, based on the productivity index, a location in the subsurface region for completion of the given well using an implementation tool.

* * * * *